United States Patent [19]

Miller

[11] Patent Number: 4,994,284

[45] Date of Patent: * Feb. 19, 1991

[54] ANIMAL FEED SUPPLEMENT SUSPENSION

[75] Inventor: Alex E. Miller, Placentia, Calif.

[73] Assignee: Union Oil Company of California, Los Angeles, Calif.

[ * ] Notice: The portion of the term of this patent subsequent to Dec. 19, 2006 has been disclaimed.

[21] Appl. No.: 447,542

[22] Filed: Dec. 7, 1989

Related U.S. Application Data

[63] Continuation of Ser. No. 879,595, Jun. 27, 1986, Pat. No. 4,888,185.

[51] Int. Cl.$^5$ ............................................... A23K 1/00
[52] U.S. Cl. ......................................... 426/74; 426/69; 426/623; 426/630; 426/636; 426/658; 426/807
[58] Field of Search .................. 426/69, 72, 74, 658, 426/623, 630, 636, 807

[56] References Cited

U.S. PATENT DOCUMENTS

| | | | |
|---|---|---|---|
| 3,794,740 | 2/1974 | Achorn et al. | 426/74 |
| 3,895,117 | 7/1975 | Backlund | 426/658 |
| 3,901,976 | 8/1975 | Roth et al. | 426/69 |
| 3,962,484 | 6/1976 | Grosso et al. | 426/74 |
| 4,062,988 | 12/1977 | DeSantis | 426/69 |
| 4,219,572 | 8/1980 | Jackman | 426/74 |
| 4,382,966 | 5/1983 | Mickus et al. | 426/69 |
| 4,729,896 | 3/1988 | Sawhill | 426/69 |

OTHER PUBLICATIONS

Hawley, "The Condensed Chemical Dictionary", 10th Edition, 1982, pp. 392, 633 and 936.

Primary Examiner—R. B. Penland
Attorney, Agent, or Firm—Gregory F. Wirzbicki; Shlomo R. Frieman

[57] ABSTRACT

An alkaline supplement for ruminant feeds is a fluid suspension comprising the components: about 20 to about 40 percent by weight water; about 2 to about 10 percent by weight sodium carbonate; about 2 to about 10 percent by weight calcium phosphate; about 10 to about 40 percent by weight molasses; about 5 to about 30 percent by weight limestone; up to about 15 percent by weight urea; up to about 5 percent by weight magnesium oxide; up to about 20 percent by weight dolomite; up to about 30 percent by weight fat; up to about 30 percent by weight protein meal; and a suspending agent.

20 Claims, No Drawings

ANIMAL FEED SUPPLEMENT SUSPENSION

This application is a continuation, of application Ser. No. 06/879,595, filed June 27, 1986, U.S. Pat. No. 4888185.

INTRODUCTION TO THE INVENTION

This invention relates to the field of animal nutrition and, more particularly, to feed supplements for ruminants.

Livestock which are being raised for consumption may be considered as chemical factories, wherein nutrient chemicals are used as the input and products such as meat and milk are later recovered. As with any other chemical factory, the animals have certain requirements for the input materials, if a maximized production efficiency is to be obtained. It is desired to feed a ration which is balanced to provide all nutritional requirements for the expected production.

Unfortunately, however, it is very difficult to supply all of the nutritional requirements of livestock, using only the readily available crop feeds. Cattle, for example, may be fed a ration including roughage, such as in alfalfa hay, and concentrates (low-fiber, higher energy materials), such as silage and corn or other grains. The nutritional composition of the ration will be found to vary considerably over a period of time, due to the changes in nutrient content which are observed during various harvesting periods of even a single crop growing season, losses in nutrients during storage, and the wide variation in soil nutrient contents from one plot of land to another. For this reason, it may not be practical to provide a completely balanced ration using only crop materials.

Supplements have been commonly used to correct nutritional deficiencies in livestock feeds. In ruminants such as cattle, urea or other non-protein nitrogeneous compounds can be added to compensate for a deficiency of protein in the ration. Various minerals, particularly calcium, phosphorus, salt, iodine, and iron are frequently not present in feeds in their required amounts, so are added to those feeds as supplements. Further, the caloric content of feeds can be increased by supplementation with various fats, such as meat by-products, and sugars, such as molasses. The vitamin content of feeds frequently is insufficient; this situation is correctable by appropriate supplementation.

Due to the high costs of the usual animal feeds, it is not always economically feasible to supply a balanced ration with crop materials, even if an appropriate mixture could be procured. Therefore, locally available by-products, such as sugar beet pulp, wastes from potato processing factories, grain wastes from breweries or distilleries, wheys, grain hulls, and many other by-products which can be obtained at a relatively low cost, are fed to livestock in place of some or all of a more customarily fed crop material. Some supplementation is normally required when such by-products are used.

Supplements are fed in three manners: (1) special feeding, separately from other feeds; (2) offered to the animals on a continuing, free-choice basis; or (3) mixed with other feeds. To assure a more uniform ingestion of the supplements, it is preferable to mix desired amounts with other feeds and present the mixture to the animals at scheduled feeding times. However, considerable problems are often encountered in blending and distributing the mixed, supplemented feeds, particularly in facilities such as cattle feed lots and large dairy farms where large quantities of feed must be handled every day. In addition, even if it would be possible to satisfactorily mix dry feed and dry supplement materials, separation invariably will be a problem, as the mixture is handled and distributed to the animals. Further, finely divided particulate solids present a palatability problem with many animals.

These difficulties are avoided, to a large degree, by the use of fluid supplements which can be applied to feeds, such as by a simple spraying before or during distribution. It is, of course, possible to dissolve several supplements (e.g., salt, urea, etc.) in water for application to dry feed materials. Certain other supplements have been suspended in liquids: U.S. Pat. No. 3,988,483 to Deyoe et al. relates the formation of an aqueous slurry of a starch-bearing feed material and urea, then cooking the slurry to gelatinize starch and form a suspension; U.S. Pat. No. 4,055,667 to Linton et al. describes the formation of a suspension from brewer's spent yeast slurry, a material providing "colloidal water-binding capacity" (such as attapulgite clay), and a number of optional materials; and U. S. Patent 4,382,966 to Mickus et al. utilizes xanthan gum as an aid to maintaining an aqueous suspension of calcium carbonate and other animal feed supplements.

SUMMARY OF THE INVENTION

The invention is a "fluid total supplement," in which many desired ruminant nutritional supplement materials can be incorporated. This supplement is generally characterized by liquid pH values greater than about 9 and contains about 20 to about 40 percent by weight water, with the following typical weight percentages of other components: urea, up to about 15; suspending agent, up to about 2; sodium carbonate, about 2 to about 10; calcium phosphate, about 2 to about 10; magnesium oxide, up to about 5; dolomite or magnesium carbonate, up to about 20; molasses, about 10 to about 40; limestone, about 5 to about 30; fat, up to about 20; and protein meal, up to about 30. In addition, vitamins, medicaments, and materials which function as digestive aids can be included in the supplement.

DETAILED DESCRIPTION OF THE INVENTION

The present invention is a fluid feed supplement, particularly for adding to feed intended for ruminants, which can be made to incorporate several components. An alkaline pH is desired, both for an ability to moderate acidity in the rumen and for an ability to stabilize highly fermentable feedstuffs, such as grains, silage, potato processing by-products, and the like. This supplement will be used to correct nutritional imbalances in the feed and is described hereinafter by individually discussing the components and methods for combining the components.

Since it is desired to produce an alkaline supplement, sodium carbonate is used, in amounts about 2 to about 10 percent by weight.

Alkaline buffers are important in feed supplements for cattle which are being fed very high proportions of concentrates in their diets. Saliva which is produced by an animal contains buffering species (including bicarbonate and phosphate). Flows of this saliva are stimulated by the additional chewing and digestive processing required for high fiber-containing materials, which stimulation is lessened considerably when a high concentrate (i.e., high starch) ration is consumed. As a consequence of decreased saliva flows and increased rumen fermentation, hydrogen ion concentrations increase in the rumen, preventing efficient digestion of the feed. Dairy cows, in particular, tend to exhibit decreased milk production and decreased milk fat content as the rumen acid levels increase, which decreases can be reversed by supplementation with alkaline materials.

Sodium carbonate offers certain benefits which would not be obtained by using alkali bicarbonates or sesquicarbonates (e.g., $Na_2CO_3 \cdot NaHCO_3$) in the supplement. First, sodium carbonate has a higher aqueous solubility, permitting greater flexibility in the formulation procedure. Further, sodium carbonate is considerably less expensive, and has a higher neutralization capacity than either the bicarbonate or sesquicarbonate. By using the anhydrous form, caking of the sodium carbonate during normal storage will be minimal, resulting in a greater ease of handling particularly over the bicarbonate. In addition, carbon dioxide evolution, and a resulting foaming, has been observed when sodium bicarbonate is added to aqueous solutions having initial pH values less than about 8; no such problem is found with adding sodium carbonate to solutions which are not strongly acidic. Using sodium carbonate, gradual chemical changes during storage of the supplement which can cause lowering of the pH will be less likely to bring about carbon dioxide evolution and the attendant foaming.

Limestone is also added to the supplement, in amounts about 5 to about 30 percent by weight. This limestone should be predominately calcium carbonate and have particle sizes less than about 100 mesh (150 micrometers), more preferably less than about 200 mesh (75 micrometers). Although limestone is an effective neutralizer of acids, its effect in the rumen may not be great, since the rumen pH is not normally very much below about 6. However, limestone reactivity at rumen pH levels may be enhanced by increasing the fraction of very small particles, i.e., those less than about 325 mesh (45 micrometers). It is possible that limestone also acts upon a later stage of ruminant digestion; intestinal starch digestion by cattle, which is primarily enzymatic, is reportedly improved with limestone supplementation. In any event, limestone will provide additional calcium to the ration.

About 2 to about 10 percent by weight of a calcium phosphate is used in the supplement of the invention. Soluble phosphates, such as disodium hydrogen phosphate, are not suitable due to their adverse effects (including undesired gelling or other thickening) upon maintenance of a stable suspension. Either dicalcium phosphate ($CaHPO_4 \cdot 2H_2O$) or defluorinated phosphate rock are preferred components. Since the calcium phosphate will remain primarily in suspension, particle sizes should generally be about the same as those of the limestone.

The calcium phosphate is included to assure maintenance of proper skeletal concentrations in mature animals, as well as providing the additional requirements of growing, pregnant, and lactating animals. Concentrates are particularly low in calcium, and roughages can be deficient in phosphorus unless phosphate fertilization has been used in the soil in which the roughage crops were grown; including calcium phosphate in the supplement ensures the presence of adequate amounts in the ration and ensures the proper balance of calcium and phosphorus.

A large number of nutritious by-product liquors are available for including in the supplement, in amounts about 10 to 40 percent by weight, primarily as carbohydrate sources (although many contain significant amounts of proteins, minerals, and other desirable components). These by-product liquors include cane and beet molasses (generally referred to as simply "molasses"), lignin sulfonate liquors from sulfite paper pulping, citrus molasses, starch molasses, hemicellulose extract (wood molasses), condensed whey products, condensed fermentation solubles, condensed alfalfa solubles, corn steep liquor, condensed Steffens filtrate from sugar factories, and many others. Frequently, the choice between the various liquors will be dictated by economic considerations: one or more products will be much less expensive than the others, in a particular locality. Mixtures of liquors are also useful as components of the supplement.

Molasses is a preferred carbohydrate source in the supplement since it is highly concentrated, energy-rich, and readily available. Either cane or beet molasses can be used. This component is desired as a relatively inexpensive carbohydrate source and for increasing palatability of the supplement and feeds with which it is mixed; cattle, in particular, tend to consume more feeds when molasses is added.

The supplement also includes about 20 to about 40 percent by weight water, to provide a proper fluidity to the mixture. This water should be of appropriate quality for use as livestock drinking water.

Urea can be added to the supplement, in amounts up to about 15 percent by weight, and is highly preferred over ammonium compounds since urea will not release objectionable quantities of ammonia from the alkaline suspension. As discussed, supra, some of a ruminant animal's protein requirements can be supplied by nonprotein nitrogen compounds; microorganisms in the rumen utilize the nitrogen in urea for their replication and then the bacteria, etc. so produced are digested by the ruminant in later stages of the digestive system. Due to its water solubility, urea will normally be in solution.

Up to about 5 percent by weight magnesium oxide can be included in the supplement, in the form of particles having sizes less than about 100 mesh (150 micrometers), more preferably less than about 200 mesh (75 micrometers), both for its pH buffering effect in the rumen and for magnesium supplementation. Dairy cows have been observed to give increased production from supplementation with magnesium oxide, an effect which could be attributed to buffering, correction of a magnesium deficiency, or both. The magnesium oxide should be a "low reactivity" grade which has been calcined at high temperatures, since it has been found that the more reactive grades tend to cause an unacceptable gelling and thickening of the suspension. However, refractory grades, calcined at very high temperatures, are too inert for animal feeding.

Magnesium oxide reactivity is primarily controlled by particle sizes and the degree of calcining, since both factors affect the reactive surface area. While the invention is not to be bound to any particular theory, it is currently considered likely that acceptable reactivity will be obtained from magnesium oxides having surface areas, as measured by standard BET techniques, about 2 to about 20 square meters per gram. Materials having higher or lower surface areas may also be acceptable, but appropriate testing will be required to ascertain the formation of acceptable suspensions and availability of the magnesium content to animals.

A presently preferred magnesium oxide is the product named "Animag-200," and sold by Martin-Marietta Chemicals. This material has a typical surface area about 5 square meters per gram and a desirable particle size distribution: typically at least 95 weight percent passing through a 200 mesh (75 micrometers) sieve.

As an alternative to, or in addition to, magnesium oxide, dolomite or magnesium carbonate can be a component of the supplement, in amounts up to about 20 percent by weight. Particle sizes should generally be similar to those of the magnesium oxide, to keep the material in suspension. If dolomite is to be added, its calcium content may be determined and a corresponding amount of limestone deleted from the formulation, although dolomitic calcium may not be as available to the animal as is calcium from limestone.

Fat materials can be quite economical energy sources for animals and can be included in the supplement of this invention, in amounts up to about 20 percent by weight. These fats can be of animal or vegetable origin, including rendered tallows and greases from animal sources and acidulated soap stocks produced as by-products in the alkali refining of crude vegetable oils. Generally, fats used for animal feeding contain significant amounts of free fatty acids (e.g., about 10 to about 90 percent by weight), as well as triglycerides. In addition to being an energy source, the fatty acid material appears to greatly assist in maintaining a stable suspension, possibly due to soap formation through a reaction with alkaline components of the supplement. By using an appropriate amount of fat, a stable suspension can be produced without a need for any additional suspending agents.

Suspending agents which are useful in the supplement include clays and polysaccharide gums. Dispersed clays, such as attapulgite, sepiolite, bentonite, and the like can be added, in amounts at least about 0.5, more preferably about 0.5 to about 2 percent by weight of the supplement. Useful gums include xanthan gum and the less expensive mixtures comprising 1 part xanthan gum plus up to 3 parts guar gum; gums should be used at a level at least about 0.05 percent by weight, but are normally not required to be present in amounts greater than about 0.2 percent by weight. The gums are considerably more expensive than are the clays, so will be likely to find less utility in the practice of the invention.

When the supplement contains magnesium oxide, but no fats, clay suspending agents will not provide suspensions which are stable for more than a few days. Concurrently with the observed decline in viscosity is a pH increase from initial values about 10 to values about 11. By omitting magnesium oxide, with or without a substitution of dolomite to provide magnesium, clays work very well as suspending agents. Further, even if magnesium oxide is present, clays will be suitable suspending agents if at least about 2 percent by weight fat is also present.

For use with feeds which are low in protein, up to about 30 percent by weight of protein meals can be incorporated into the supplement. These meals include linseed meal, cottonseed meal, soybean meal, fish meal, meat meal, skim milk powder, brewer's yeast, and many others. Mixtures of the meals are also useful. To maintain a stable suspension, particles of the protein meals usually should not exceed about 20 mesh (850 micrometers), although these low density, porous materials tend to assume the density of a liquid medium, when wetted; particle size is not particularly critical.

U.S. Pat. No. 4,376,790 to Ames describes a volatile fatty acid feed supplement which is effective for increasing the milk production of dairy cows, comprising mixed ammonium salts of isobutyric, valeric, isovaleric, and 2-methylbutyric acids. The material is commercially available as a mixture of calcium salts from Eastman Chemicals Division of Eastman Kodak Company, under the name IsoPlus TM Nutritional Supplement. The present suspension has been found to be an ideal vehicle for incorporating these and other volatile fatty acids having about 4 to about 5 carbon atoms, in amounts up to about 10 percent by weight. Due to the alkaline nature of the suspension, hydrolysis of the acid salts is effectively suppressed, thereby preventing the exceptionally disagreeable odor which would accompany free acid formation. Also, palatability of the compounds to the animals is enhanced by the "masking" action of the alkalinity and other suspension components.

In addition to the foregoing, other components such as vitamins, medicaments, and the like can be added, as desired for correcting nutritional deficiencies or improving the health of livestock.

To prepare the supplement composition, aqueous materials are placed in a vessel with suspending agents, the liquid is agitated, and insoluble components are introduced. Agitation must be continued until a uniform suspension is obtained. It is preferred that a "high shear" mixer be used, as is utilized for preparing suspension fertilizers.

The supplement of this invention can be easily mixed with animal feeds, using equipment which is customarily used for preparing feed mixtures. In many large feeding operations, devices such as rotating drum-shaped mixer vessels are used to mix roughages and concentrates; supplement suspension can be sprayed onto other feed components as they are conveyed to the mixer. Alternatively, the suspension can be sprayed into the mixer, while it is in operation with a load of feeds. Combination of feeds and the supplement can also be accomplished in a more simple manner, by spraying or sprinkling the fluid material onto feeds during, or immediately following, distribution of the feeds, e.g., in a manger. Numerous other methods are suitable, as will occur to those in the art.

The following examples are illustrative of various aspects of the invention and are not intended to limit the invention, the scope of the invention being fully defined by the appended claims. In the examples, all percentages are expressed on a weight basis.

EXAMPLE 1

Suspension supplements for cattle feeding are prepared, using the materials described in Table I. The preparative method begins with placing the first component in a vessel equipped with a mixing device, agitating the component, and then sequentially adding the remaining components in the listed order, with continuous agitation. The components include an aqueous urea solution, a colloidal dispersion of sepiolite clay in water, either 86° Brix cane molasses or 80° Brix beet molasses, limestone containing 38 percent calcium, and a fat mixture containing about 30 percent free fatty acid and 95 percent total fat, derived from a commercial blend of animal and vegetable source by-product fats.

The resulting suspensions do not show significant changes in viscosity upon standing for a period of at least 30 days and do not have visible separation to form a clear layer. After 17 days, the initial pH (9.6) of the cane molasses-containing suspension is unchanged, and the beet molasses-containing suspension has changed only slightly, from an initial pH of 9.8 to one of 10.2.

TABLE I

| Component | Percent |
|---|---|
| 50% Urea Solution | 14.0 |
| 20% Clay Dispersion | 5.0 |
| Water | 27.4 |
| Na$_2$CO$_3$ | 4.6 |
| CaHPO$_4$.2H$_2$O | 5.4 |
| MgO | 2.6 |
| Molasses | 22.0 |
| Limestone | 11.0 |
| Fat | 8.0 |

EXAMPLE 2

Suspensions are prepared using the components of the preceding example and a similar procedure, except that dolomite containing 13 percent magnesium and 22 calcium is substituted for the magnesium oxide. The formulation is described in Table II.

These suspensions are stabilized against significant viscosity changes and visible clear layer separation for a period of at least 30 days. After 17 days, the cane molasses suspension is seen to change from an initial pH of 9.5 to a value of 8.9, while the beet molasses suspension changes from pH 9.7 to a value of 9.0.

TABLE II

| 50% Urea Solution | 14.0 |
|---|---|
| 20% Clay Dispersion | 5.0 |
| Water | 24.8 |
| Na$_2$CO$_3$ | 4.6 |
| CaHPO$_4$.2H$_2$O | 5.4 |
| Molasses | 22.0 |
| Dolomite | 11.4 |
| Limestone | 4.8 |
| Fat | 8.0 |

EXAMPLE 3

Experiments are conducted to determine the effects of fat and clay suspending aid concentrations upon suspension stability.

The components of Example 1, including cane molasses, are used to prepare suspensions containing no clay and varying amounts of fat. Incrementally higher fat concentrations cause continued increases in viscosity and decreases in the amount of clear supernatant liquid observed after the suspension stands undisturbed for 21 days; fat concentrations greater than about 8 percent give suspensions having no visible clear liquid. Decreases in pH accompany increased fat concentrations.

Viscosity and pH values for suspensions so prepared are summarized in Table III. Viscosity is measured at 22° C. with a Brookfield Rotational Viscometer, using a No. 4 spindle at 20 r.p.m.

TABLE III

| Percent Fat | pH After 7 Days | Viscosity, poise | | | | |
|---|---|---|---|---|---|---|
| | | 0 Days | 1 Day | 7 Days | 10 Days | 20 Days |
| 0 | 10.5 | 7 | 2 | 1 | 1 | 1 |
| 2 | 10.0 | 6 | 3 | 2 | 2 | 2 |
| 4 | 9.8 | 4 | 2 | 3 | 6 | 6 |

TABLE III-continued

| Percent Fat | pH After 7 Days | Viscosity, poise | | | | |
|---|---|---|---|---|---|---|
| | | 0 Days | 1 Day | 7 Days | 10 Days | 20 Days |
| 6 | 9.8 | 3 | 2 | 8 | 8 | 8 |
| 8 | 9.7 | 3 | 4 | 10 | 10 | 10 |
| 16 | 9.5 | 5 | 29 | 48 | 43 | 40 |

A separate series of suspensions is prepared, omitting the fat and comparing colloidally dispersed sepiolite, attapulgite, and sodium bentonite clays. Viscosities of these suspensions are summarized in Table IV, as measured in a manner similar to that described above.

TABLE IV

| Clay Type | Percent | Viscosity, poise | | | | |
|---|---|---|---|---|---|---|
| | | 0 Days | 1 Day | 7 Days | 10 Days | 20 Days |
| None | — | 7 | 2 | 1 | 1 | 1 |
| Attapulgite | 1.5 | 31 | 10 | 2 | 2 | 2 |
| Bentonite | 1 | 36 | 10 | 8 | 2 | 2 |
| Sepiolite | 1 | 21 | 10 | 2 | 2 | 2 |
| Sepiolite | 1.5 | 46 | 10 | 4 | 3 | 3 |

Another series of suspensions contains 1 percent dispersed sepiolite clay as the suspending agent and varying amounts of fat are included. Viscosities of the suspensions are summarized in Table V, as measured in a manner described above. Further experiments indicate that suspensions containing about 2 to about 4 percent fat have suitable stabilities when about 1.5 percent clay is included, and suspensions with about 8 percent fat are stable when about 0.5 percent clay is used.

TABLE V

| Percent Fat | Viscosity, poise | | | | |
|---|---|---|---|---|---|
| | 0 Days | 1 Day | 7 Days | 10 Days | 20 Days |
| 0 | 21 | 10 | 2 | 2 | 3 |
| 2 | 15 | 15 | 8 | 7 | — |
| 4 | 15 | 19 | 13 | 11 | — |
| 8 | 21 | 29 | 31 | — | — |
| 16 | 30 | 90 | 84 | 80 | 62 |

EXAMPLE 4

Suspensions are prepared using the components of Example 1, including cane molasses, but substituting various concentrations of polysaccharide gum suspending agents for the clay, and omitting the fat.

Viscosity is measured in the suspensions at 22° C. using a Brookfield Rotational Viscometer having a No. 4 spindle, and rotating at 20 r.p.m. Results are summarized in Table VI, showing the acceptable viscosities obtained with these suspending agents, even in the presence of magnesium oxide. In the table, "X" indicates xanthan gum sold by Kelco Company under the name Kelflo. "X-G" indicates a mixture containing 1 part of the above-described xanthan gum and 3 parts of guar gum sold by Celanese Chemical Company under the name Jaguar A40-F.

TABLE VI

| Gum | Percent | Viscosity, poise | | | | |
|---|---|---|---|---|---|---|
| | | 0 Days | 1 Day | 7 Days | 10 Days | 20 Days |
| None | — | 7 | 2 | 1 | 1 | 1 |
| X | 0.1 | 16 | 9 | 8 | — | — |
| X | 0.2 | 21 | 15 | 15 | 16 | 20 |
| X-G | 0.2 | 22 | 22 | 22 | 23 | 35 |

What is claimed is:

1. An alkaline aqueous suspension for use as an animal feed supplement, the suspension comprising water, calcium phosphate, a nutritious by-product liquor, limestone, a sufficient amount of sodium carbonate to enable the suspension to have a pH greater than 9 and a sufficient amount of a suspending agent to stabilize the suspension, the suspension being capable of remaining fluid upon standing for at least 17 days.

2. The suspension of claim 1 comprising about 20 to about 40 weight percent water, about 2 to about 10 weight percent sodium carbonate, about 2 to about 10 weight percent calcium phosphate, about 10 to about 40 weight percent nutritious by-product liquor, and about 5 to about 30 weight percent limestone.

3. The suspension of claim 2 wherein the suspending agent is selected from the group consisting of fat, clay, polysaccharide gums, and mixtures thereof.

4. The suspension of claim 2 wherein the suspending agent is selected from the group consisting of fat, clay, polysaccharide gums, and mixtures thereof, wherein:
   a. the fat, when present, constitutes up to about 20 weight percent of the suspension;
   b. the clay, when present, constitutes at least about 0.5 weight percent of the suspension; and
   c. the gum, when present constitutes at least about 0.05 weight percent of the suspension.

5. The suspension of claim 2 wherein the suspending agent comprises fat and clay, the suspension comprising about 2 to 16 weight percent fat and about 0.5 to about 2 weight percent clay.

6. The suspension of claim 2 wherein the composition is substantially devoid of magnesium oxide that is not low reactivity grade.

7. The suspension of claim 2 wherein the suspension is substantially devoid of soluble phosphates.

8. The suspension of claim 2 wherein the suspension is substantially devoid of ammonium compounds capable of releasing objectionable quantities of ammonia from the suspension.

9. The suspension of claim 2 wherein the suspension is substantially devoid of soluble phosphates, magnesium oxide that is not low reactivity grade, and ammonium compounds capable of releasing objectionable quantities of ammonia from the suspension.

10. The suspension of claim 9 further comprising low reactivity grade magnesium oxide, the low reactivity grade magnesium oxide being present in the suspension in a concentration of up to about 5 weight percent.

11. An alkaline aqueous suspension for use as an animal feed supplement, the suspension comprising water, a sufficient concentration of sodium carbonate to enable the suspension to have a pH of greater than 9, calcium phosphate, a nutritious by-product liquor, limestone, and a sufficient amount of fat to stabilize the suspension, the suspension being (a) substantially free of clay and polysasccharide gums and (b) capable of remaining fluid upon standing for at least 7 days.

12. The suspension of claim 11 comprising about 20 to about 40 weight percent water, about 2 to about 10 weight percent sodium carbonate, about 2 to about 10 weight percent calcium phosphate, about 10 to about 40 weight percent nutritious by-product liquor, and about 5 to about 30 weight percent limestone.

13. The suspension of claim 12 wherein the composition is substantially devoid of magnesium oxide that is not low reactivity grade.

14. The suspension of claim 12 wherein the suspension is substantially devoid of soluble phosphates.

15. The suspension of claim 12 wherein the suspension is substantially devoid of ammonium compounds capable of releasing objectionable quantities of ammonia from the suspension.

16. The suspension of claim 2 wherein the suspension is substantially devoid of soluble phosphates, magnesium oxide that is not low reactivity grade, and ammonium compounds capable of releasing objectionable quantities of ammonia from the suspension.

17. An alkaline aqueous suspension for use as an animal feed supplement, the suspension comprising water, a sufficient concentration of sodium carbonate to enable the suspension to have a pH greater than 9, calcium phosphate, a nutritious by-product liquor, limestone, low reactivity grade magnesium oxide, a suspending clay, and fat, the fat being present in an amount sufficient to stabilize the viscosity of the suspension for at least about 7 days, and the suspension being capable of remaining fluid upon standing for at least 17 days.

18. The suspension of claim 17 comprising about 20 to about 40 weight percent water, about 2 to about 10 weight percent sodium carbonate, about 2 to about 10 weight percent calcium phosphate, about 10 to about 40 weight percent nutritious by-product liquor, about 5 to about 30 weight percent limestone, up to about 20 weight percent fat, and at least about 0.5 weight percent clay.

19. The suspension of claim 18 comprising about 2 to about 8 weight percent fat and about 0.5 to about 2 weight percent clay.

20. The suspension of claim 18 wherein the suspension is substantially devoid of soluble phosphates, magnesium oxide that is not low reactivity grade, and ammonium compounds capable of releasing objectionable quantities of ammonia from the suspension.

* * * * *

UNITED STATES PATENT AND TRADEMARK OFFICE
CERTIFICATE OF CORRECTION

PATENT NO. : 4,994,284

DATED : February 19, 1991

INVENTOR(S) : Alex E. Miller

It is certified that error appears in the above-identified patent and that said Letters Patent is hereby corrected as shown below:

Column 10, Line 25, claim 16, delete "2" and insert therefor -- 12 --.

Signed and Sealed this

Twenty-second Day of September, 1992

Attest:

DOUGLAS B. COMER

*Attesting Officer*   *Acting Commissioner of Patents and Trademarks*